Inventors
WALTER FERRIS.
ERNST WIEDMAN.
DONALD CLUTE.

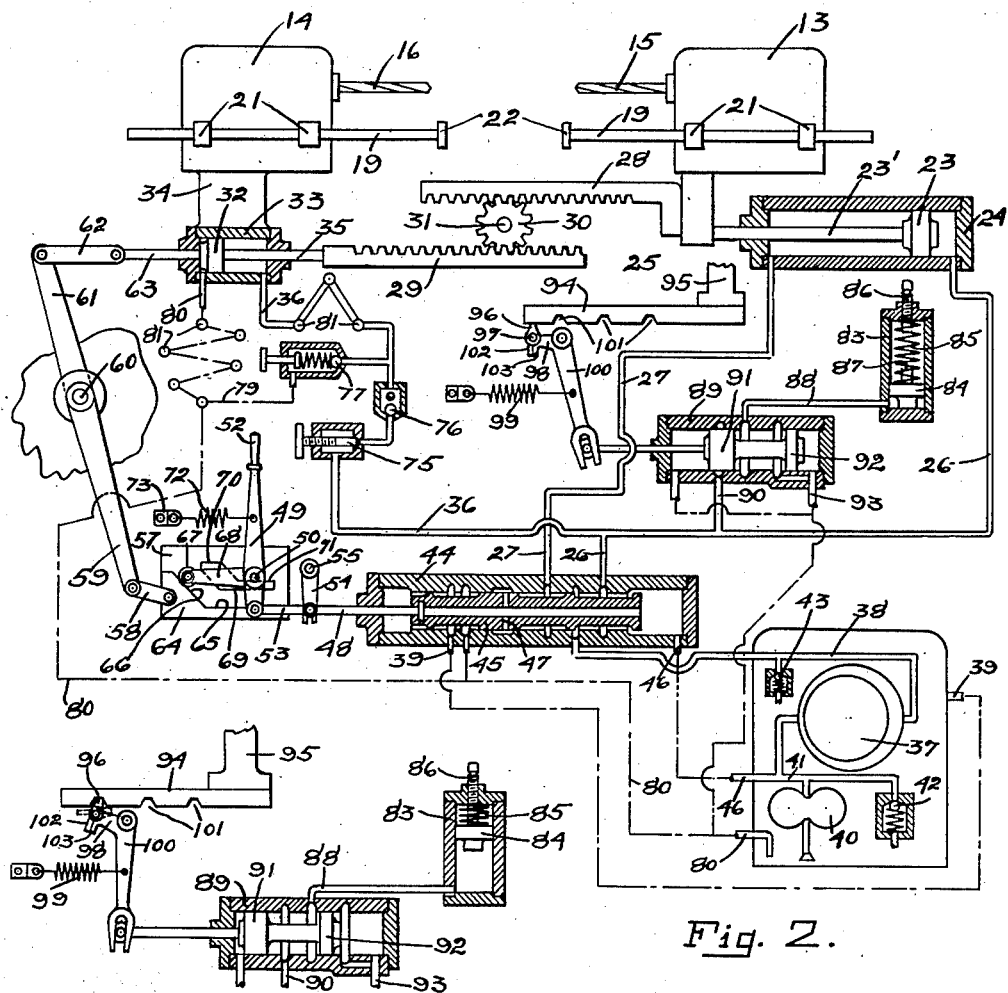

Patented Oct. 30, 1934

1,978,879

UNITED STATES PATENT OFFICE 1,978,879

DRILLING MACHINE

Walter Ferris and Ernst Wiedman, Milwaukee, Wis., and Donald Clute, Detroit, Mich., assignors to The Oilgear Company, Milwaukee, Wis., a corporation of Wisconsin Application February 24, 1930, Serial No. 430,998

8 Claims. (Cl. 77—32)

This invention relates to drilling machines and particularly to feed mechanisms therefor.

One object of the present invention is the provision of an improved hydraulic feed mechanism for a two-way drilling machine automatically operable to complete a long hole through a work piece by simultaneously drilling from opposite ends toward the center of the hole. This we have accomplished by the use of a hydraulic system which effects and insures an accurately regulated advance of opposed drills and by which the hole is completed without conflict between the drills.

Another object is the provision in a deep hole drilling machine of feed mechanism automatically operable to interrupt and renew the drilling operation in such manner as to avoid chip accumulation and clogging.

Another object is the provision in a deep hole drilling machine of feed mechanism automatically operable to effect intermittent retraction of the drill or drills during a drilling cycle.

Other more specific objects and advantages will appear from the following description of an illustrative embodiment of the present invention.

Fig. 2 is a diagrammatic illustration of the hydraulic system employed.

Figs. 3, 4 and 5 are sectional views of the control valve shown in Fig. 2 illustrating three characteristic positions thereof.

Fig. 6 is a view of a part of the system shown in Fig. 2 illustrating a second position thereof.

Fig. 7 is an enlarged view of the dog shown in Figs. 2 and 6.

Figure 1:
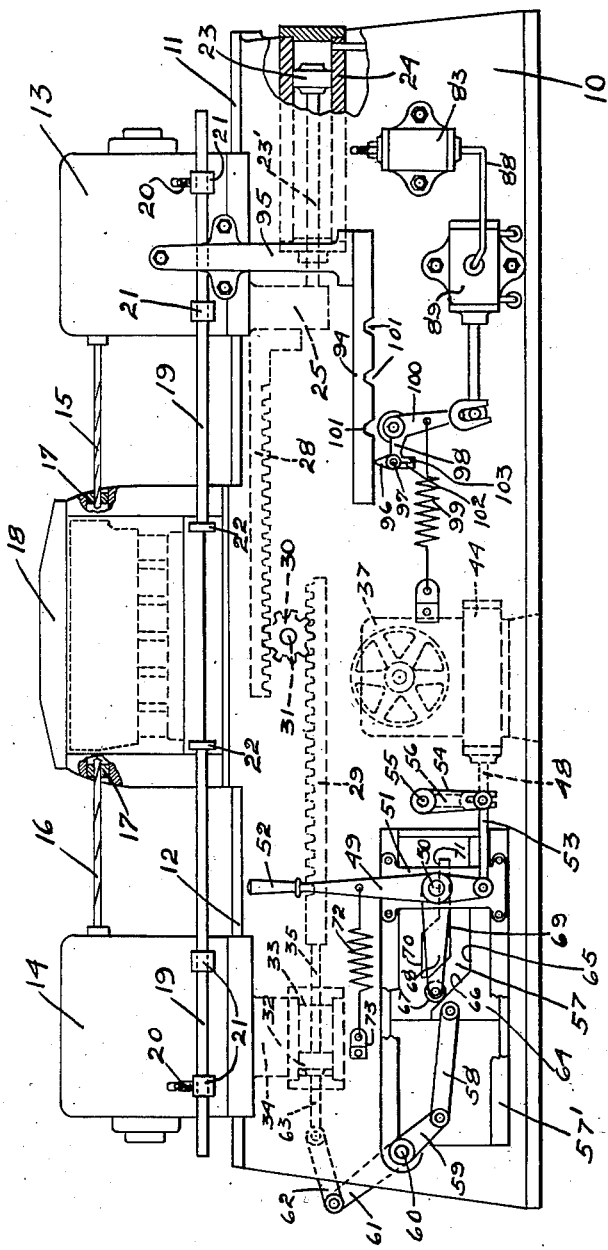
Figure 1 is a side elevation of a hydraulically operated drilling machine embodying the present invention.

The drilling machine shown, though capable of other uses, is designed for drilling long holes through a piece of work such as an engine block or the like by drilling from opposite ends toward the center of the hole. The machine shown comprises a horizontal bed 10 having longitudinal ways 11 and 12 at opposite ends thereof for supporting and guiding a pair of translatable drill heads 13 and 14, respectively. The heads carry oppositely directed aligned drills 15 and 16 arranged to project through appropriate guides 17 formed in a work holder 18 of usual construction, disposed between the heads. The drills shown are mechanically rotated in a well known manner by mechanism forming no part of the present invention. In this instance the drill heads 13 and 14 also carry aligned stop rods 19 adjustably fixed by screws 20 in appropriate brackets 21 projecting from the heads. The rods carry end heads 22 which coact to limit the advance of the drill heads 13 and 14 toward each other.

The drill head 13 is advanced and retracted along the ways 11 by a piston 23, working in a cylinder 24 fixed in the bed of the machine, the piston 23 being connected through a rod 23' with an arm 25 fixed to and depending from the head 13 intermediate the ways 11. Driving liquid is supplied to the opposite ends of the cylinder 24 through pipes 26 and 27 from an appropriate pressure source to be later described. The drill head 14 is advanced and retracted along the ways 12 simultaneously with the advance and retraction of the head 13. This is accomplished in this instance by a pair of racks 28 and 29 which mesh with the opposite sides of an intermediate pinion 30 rotatable upon a shaft 31 fixed in the bed. Rack 28 is fixed to the arm 25 of head 13 and rack 29 is connected to the head 14 through a piston 32 and cylinder 33, the cylinder 33 being fixed in an arm 34 depending from the head 14, and the piston 32 being connected through a rod 35 with the rack 29. The piston 32 is normally retained in the left end of cylinder 33 by hydraulic pressure transmitted through a pipe 36, so that the head 14 normally moves in unison with the rack 29. Thus as the head 13 advances toward the work the motion of the rack 28 is transmitted through pinion 30 to the rack 29 to thereby simultaneously advance the head 14 toward the work at the same rate.

The cylinder 23 is supplied with liquid from a variable delivery pump 37 of a well known type such for instance as that described in Patent No. 1,753,562 issued April 8, 1930 to John P. Ferris. The pump therein described is driven at constant speed and delivers liquid at a variable rate through a pipe 38. The rate of delivery is increased by the application of fluid pressure to a pipe 39. A gear pump 40 of well known construction, ordinarily contained in the pump housing, receives liquid from a sump in the bottom of the housing and delivers liquid through a pipe 41 to the intake side of the variable delivery pump. A low pressure relief valve 42 connected with pipe 41 determines the pressure therein, and a high pressure relief valve 43 connected with pipe 38 limits the discharge pressure of the variable delivery pump. The pipe 38 leads to a control valve 44 to which the pipes 26 and 27 are connected. Valve 44, which is also fully described in said application, includes a hollow core 45 longitudinally movable within a bore of the valve housing. The interior of the core and the opposite ends of the bore are flooded with liquid under low pressure supplied from the gear pump through a pipe 46.

The arrangement is such that with the core 45 of valve 44 in the intermediate position of Fig. 2 pipe 26 is exposed to the gear pump pressure in pipe 46, pipe 27 is blocked so that piston 23 is constrained against movement, and pipe 38 is connected to the intake side of the variable delivery pump through pipes 46 and 41. When the core 45 of the control valve is shifted toward the left into the position of Fig. 4, pipe 27 is connected with pipe 46 through a transverse passage 47 in the core, and pipe 26 is connected with the pipe 38, so that the piston 23 then advances toward the left at a rate dependent upon the rate of pump delivery through pipe 38. When the core 45 is shifted into the left extreme position of Fig. 3, pipe 39 is exposed to the gear pump pressure within the bore of the valve housing so that the rate of delivery through pipe 38 is increased, and pipe 38 is connected with both pipes 26 and 27, so that the piston 32 is then driven rapidly toward the left due to the greater pressure area on the right end face thereof, the area of the left end face being reduced by the rod 23'. When the core 45 is shifted into the right position of Fig. 5, pipe 26 is connected with pipe 46, and pipe 27 with pipe 38, so that the piston 23 then moves rapidly toward the right, the pipe 39 being exposed to the gear pump pressure in the bore of the valve and thus effecting a rapid delivery of liquid through pipe 38. The core 45 is operated and controlled by a stem 48 connected therewith. Since the pump and control valve are fully described in the application hereinabove identified a further or more detailed description thereof is deemed unnecessary.

In this instance the stem 48 of the valve 44 is placed under the control of a lever 49 rockably supported intermediate its ends upon a rock shaft 50 journalled in an appropriate bracket 51 applied to the front of the machine. The upper end of lever 49 is shaped to provide a convenient handle 52 and the lower end thereof is connected through a link 53 with a lever arm 54 fixed to one end of a rock shaft 55, journalled in the bed of the machine, and carrying a forked lever arm 56 connected with the valve stem 48.

In the machine shown the lever 49, and consequently the valve stem 48 and core 45, are automatically operated by mechanism under the control of the drill head 13. Mechanism for this purpose includes a slide plate 57 mounted for lengthwise travel within appropriate guides 57' applied to the front of the machine. The slide plate is connected through a link 58 with the lower end of a lever 59 which is fixed at its upper end upon a stub shaft 60 projecting through the front of the machine. The shaft 60 has a lever 61 fixed upon the inner end thereof and connected through a link 62 with a tail rod 63 attached to the piston 32, so that the levers 59 and 61 swing in response to movement of the rack 29 and consequently in response to the movement of the head 13. The slide plate 57 carries a cam 64 having a horizontal straight edge 65 and an inclined straight edge 66 for cooperation with a roller 67 carried by a lever arm 68 which is connected to the lever 49 to move therewith. A second cam 69 carried by the slide plate is shaped to provide a high straight edge 70 and a low straight edge 71 which also cooperate with the cam roller 67 in a manner to be later described. A spring 72 connected with a bracket 73 fixed on the front of the machine, and with the lever 49 urges the lever 49 toward the left so as to press the roller 67 downward toward the cam 64.

The arrangement is such that with the roller 67 resting against the inclined edge 66 of the cam 64, in the position indicated in Fig. 2, the core 45 of valve 44 assumes the neutral position of Fig. 2 and the machine remains at rest. By swinging the lever 49 toward the right until the roller 67 is elevated above the edge 70 the core 45 is shifted into the left position of Fig. 3 and the head 13 advances toward the left at a rapid rate, this advance of the head 13 being transmitted through the racks 28 and 29 and lever 61 to the slide plate 57 so that the slide plate moves toward the left. The roller 67 then follows the edge 70 of cam 69, retaining the valve core 45 in rapid advance position, until the tool 15 carried by head 13 is about to engage the work at which point the roller 67 lowers onto the edge 71 of cam 69, so as to shift the valve core 45 into the position of Fig. 4 and thus reduce the rate of advance of the head 13 to an appropriate drilling feed rate. The head 13 continues this forward feed rate until the roller 67 passes beyond the edge 71 of cam 69 and lowers onto the edge 65 of cam 64, causing the valve core 45 to assume the position of Fig. 5 to thereby reverse the movement of head 13 and cause the same to effect a rapid return stroke. During this return movement of head 13 the slide plate 57 moves toward the right and the roller 67 ultimately climbs onto the inclined edge 66 until it again reaches the position shown in Fig. 2, whereupon the valve core 45 is again returned to neutral and the head 13 again comes to rest.

As previously pointed out the piston 32 is normally retained in the left end of cylinder 33 by hydraulic pressure transmitted through pipe 36, so that the cylinder 33, and consequently the head 14, normally move in unison with the rack 29 and the head 14 thus advances toward the right simultaneously with the advance of head 13 and at the same rate. In this instance pipe 36 is connected with and receives pressure from pipe 26. A needle valve 75 in the pipe 36 regulates the rate of flow therethrough and a check valve 76 therein prevents flow from cylinder 33 to the pipe 26. A high pressure relief valve 77, connected with pipe 36 between the check valve 76 and cylinder 33, limits the pressure therein, and when the pressure limit is exceeded liquid passes from pipe 36 through the relief valve 77 and pipe 79 into a drain pipe 80 which leads from the left end of cylinder 33 to the sump in the base of the pump casing. Appropriate swivel connections 81 in the pipes 36 and 80 provide sufficient flexibility to permit travel of the cylinder 33 with the head 14 relative to the other stationary parts connected therewith.

The drill heads 13 and 14 continue to advance toward each other, first rapidly, until the drills 15 and 16 are about to engage the work, and thereafter, slowly to feed the drills into the work, until head 14 is arrested by mutual impingement of the end heads 22 on the stop rods 19. When this occurs head 13 continues to advance at the same feed rate forcing the head 14 rearward and forcing the piston 32 toward the right in the cylinder 33, liquid escaping from the right end of the cylinder 33 through pipe 36, relief valve 77, the pipe 79 into the drain pipe 80.

The head 13 then continues to advance forcing the head 14 and drill 16 rearward until the drill 15 enters the hole previously produced by the drill 16, to thereby complete the hole through the work, at which time the roller 67 passes beyond the cam edge 71 and drops onto the cam edge 65 to shift the valve core 45 into the position shown in Fig. 5 and thus reverse the movement of the head 13 in the manner previously described. The head 13 then moves rapidly toward the right, to thereby withdraw the drill 15 from the work, this movement continuing until the head 13' is brought to rest by the return of the roller 67 to the position of Fig. 2 against the cam edge 66. During this return movement of head 13, the rack 29 and piston 32 move toward the left under the action of the rack 28 and pinion 30 until the piston 32 is returned into the left end of the cylinder 33 and until the head 14 has been returned into its initial position by this movement of the piston 32. During this return movement of the piston 32 toward the left end of cylinder 33, the right end of the cylinder is maintained flooded by liquid supplied from pipe 26 (under gear pump pressure) through the pipe 36, the needle valve 75 being so set as to prevent too rapid a flow through pipe 36 during this period. In this connection it will be noted that an unrestricted flow of liquid through pipe 36 to the cylinder 33 at the time of reversing the head 13 would cause the head 14 to readvance into an extreme forward position and thereby endanger the drill 16 by entanglement with chips or burrs left by the tool 15.

Although the cylinders 33 and 24 may be variously proportioned to best suit the work at hand, we have found that when the two drills 15 and 16 are of the same size and meet substantially the same resistance, the effective pressure area of the right end of piston 32 should be a little less than one half the effective pressure area of the right end of piston 23.

The accumulation of chips in the hole during a drilling operation, and particularly during the drilling of long or deep holes, is a frequent cause of tool breakage. In order to avoid this difficulty, provision is made in the machine shown for automatically interrupting the advance of the drills at intervals, and for actually retracting the same intermittently during a drilling cycle, to permit the drills to clear themselves of chips and to facilitate removal of the chips from the holes as the drilling progresses. Although this may be accomplished in various ways the mechanism now to be described is satisfactory for the purpose. This mechanism includes an expansible reservoir in the form of a cylinder 83 having a piston 84 movable therein and urged toward the lower end of the cylinder 83 by a light weight spring 85 which bears against the upper end of the cylinder. A stop screw 86 in the upper end of the cylinder cooperates with a stop 87 on the piston 84 to limit the upward movement of the piston and thus limit the volumetric capacity of the reservoir. A pipe 88 communicating with the lower end of cylinder 83 is connectible through a valve 89 with a pipe 90 which communicates with the pipe 26. Valve 89 contains a reciprocable plunger having two spaced heads 91 and 92. Head 91 controls communication between pipe 90 and pipe 88, and head 92 controls communication between pipe 88 and a drain pipe 93, so that with the plunger in the position of Fig. 2 pipe 90 is blocked and pipe 88 is open to the drain pipe 93, and with the plunger in the position of Fig. 6 pipe 90 is connected with pipe 88 and pipe 88 is disconnected from the drain pipe.

The plunger of valve 89 is placed under the control of the head 13 through mechanism preferably such as will now be described. The mechanism shown for this purpose comprises a bar 94 carried by an appropriate bracket 95 attached to the head 13 so as to travel lengthwise therewith. A dog 96 rockably supported as at 97 upon one arm 98 of a bellcrank is yieldably urged upward against the bar 94 by a spring 99 connected to the other arm 100 of the bellcrank. The bar 94 contains a series of notches 101 arranged to successively receive the dog 96 and to thereby permit the bellcrank to swing in a clockwise direction at predetermined points during the advance of the head 13. During the normal advance of the head 13 and bar 94 and the dog 96, a spring 97' yieldably retain the same in the upright position shown in Fig. 2 with the tail 102 thereof against a stop 103 on the bellcrank, but under conditions which will later appear the dog may rock clockwise into the position shown in dotted lines in Fig. 7.

It will be remembered that during the advance of the head 13 and drill 15 into the work, pipe 26 is connected with and receives driving liquid from the variable displacement pump, and that pipe 27 is exposed to gear pump pressure. The head 13 continues its advance until one of the notches 101 arrives in position to receive the dog 96, whereupon the dog is lifted thereinto by the action of the spring 99 upon the bellcrank and the plunger of valve 89 is shifted into the left position of Fig. 6. This opens communication between the pipe 26 and the reservoir 83, through pipes 90 and 88, so that the pressure in pipe 26 is destroyed, and liquid flows under gear pump pressure through pipe 27 into the left end of cylinder 24 to effect retraction of the head 13 and drill 15, and also retraction of the head 14 and drill 16 through the racks 28 and 29 and pinion 30. During this retraction the dog 96 is rocked by the forward wall of the notch 101 into the position shown in Fig. 7 to thereby clear the notch without disturbing the position of the bellcrank and valve. This retraction continues until the upward movement of the piston 84 has been arrested by the engagement of stop 87 thereon against the stop screw 86, whereupon the pressure in pipe 26 immediately rises and the advance of piston 23, heads 13 and 14, and drills 15 and 16 is renewed. During this renewed advance the dog 96 remains in the dotted line position of Fig. 7 until the notch 101 into which it had previously entered permits the return thereof into the position of Fig. 6, whereupon the dog climbs out of the notch and returns the bellcrank and valve 89 into the position of Fig. 2. The reservoir 83 is thus connected with the drain pipe 93 through which the contents of the reservoir is promptly discharged.

The advance of the heads 13 and 14 then continues until the dog 96 enters the next notch 101, whereupon the heads are again temporarily retracted in the manner described, this retraction occurring any number of times and at predetermined points during a drilling operation dependent upon the number and location of notches 101 in the bar 94. It will be noted that the extent of retraction in each instance is dependent upon the volumetric capacity of the reservoir 83 which may be regulated by adjustment of stop screw 86 to suit prevailing conditions. During each retraction the drills continue rotation and this rotation together with the retracting movement occurring from time to time is sufficient to clear the drills and holes from chips that would otherwise cause clogging and drill breakage.

Various changes may be made in the embodiment of the invention hereinabove specifically described without departing from or sacrificing the advantages of the invention as defined in the appended claims.

We claim:—

1. In a drilling machine the combination of a dril head, a work support, hydraulically actuated means for effecting relative movement between said head and support to thereby advance the drill into the work, a pump for supplying driving liquid to said hydraulically actuated means to operate the same, a reservoir, and valve mechanism operable during the advance of the tool to divert liquid from said pump to said reservoir to thereby interrupt the supply of driving liquid to said hydraulically actuated means, said reservoir when filled coacting with said means to automatically renew the advance of said drill.

2. In a drilling machine the combination of a drill head, a work support, hydraulically actuated means for effecting relative movement between said head and support to thereby advance the drill into the work, a pump for supplying driving liquid to said hydraulically actuated means to operate the same, a variable capacity reservoir, and means operable during the advance of the drill for diverting liquid from said pump to said reservoir to thereby interrupt the supply of driving liquid to said hydraulically actuated means, means for effecting retraction of said head during said interruption of liquid supply, and means for adjusting the capacity of said reservoir to thereby regulate the extent of said retraction, said reservoir when filled coacting with said hydraulically actuated means to automatically renew the advance of the drill.

3. A machine tool, comprising a support, two tool heads arranged upon said support and movable thereon toward and from each other, a hydraulic motor connected to one of said heads, a pump for supplying liquid to said motor to cause it to move said head at a definite rate proportional to pump delivery, mechanism connecting said heads to each other and normally operable to move the other head in synchronism with said motor driven head but in the opposite direction and at a definite rate proportional to the rate of movement of said motor driven head, means responsive to said heads reaching predetermined points in their advance toward each other for positively limiting further advance of said other head and for effecting reverse movement thereof during continued advance of said motor driven head, and a yieldable means providing a connection between said mechanism and said other head for permitting said reverse movement.

4. A machine tool, comprising a support, two tool heads arranged upon said support and movable thereon toward and from each other, a hydraulic motor connected to one of said heads, a pump for supplying liquid to said motor to cause it to move said head at a definite rate proportional to pump delivery, mechanism connecting said heads to each other and normally operable to move the other head in synchronism with said motor driven head but in the opposite direction and at a definite rate proportional to the rate of movement of said motor driven head, means responsive to said heads reaching predetermined points in their advance toward each other for positively limiting further advance of said other head and for effecting reverse movement thereof during continued advance of said motor driven head, a yieldable means providing a connection between said mechanism and said other head for permitting said reverse movement, and means for retracting said motor driven head in response to it reaching a predetermined point in said continued advance.

5. A machine tool, comprising a support, two tool heads arranged upon said support and movable thereon toward and from each other, a hydraulic motor connected to one of said heads, a pump for supplying liquid to said motor to cause it to move said head at a definite rate proportional to pump delivery, mechanism connecting said heads to each other and normally operable to move the other head in synchronism with said motor driven head but in the opposite direction and at a definite rate proportional to the rate of movement of said motor driven head, means responsive to said heads reaching predetermined points in their advance toward each other for positively limiting further advance of said other head and for effecting reverse movement thereof during continued advance of said motor driven head, and a yieldable hydraulic pressure transmitting means providing a connection between said mechanism and said other head for permitting said reverse movement.

6. A machine tool, comprising a support, two tool heads arranged upon said support and movable thereon toward and from each other, a hydraulic motor connected to one of said heads, a pump for supplying liquid to said motor to cause it to move said head at a definite rate proportional to pump delivery, mechanism connecting said heads to each other and normally operable to move the other head in synchronism with said motor driven head but in the opposite direction and at a definite rate proportional to the rate of movement of said motor driven head, means responsive to said heads reaching predetermined points in their advance toward each other for positively limiting further advance of said other head and for effecting reverse movement thereof during continued advance of said motor driven head, a yieldable hydraulic pressure transmitting means providing a connection between said mechanism and said other head, and a relief valve connected to said pressure transmitting means for permitting said reverse movement.

7. A machine tool, comprising a support, two tool heads arranged upon said support and movable thereon toward and from each other, a hydraulic motor connected to one of said heads, a pump for supplying liquid to said motor to cause it to move said head at a definite rate proportional to pump delivery, mechanism connecting said heads to each other and normally operable to move the other head in synchronism with said motor driven head but in the opposite direction and at a definite rate proportional to the rate of movement of said motor driven head, means responsive to said heads reaching predetermined points in their advance toward each other for positively limiting further advance of said other head and for effecting reverse movement thereof during continued advance of said motor driven head, a piston and a cylinder providing a connection between said mechanism and said other head, and a relief valve connected to said cylinder for permitting said reverse movement.

8. A machine tool, comprising a support, two tool heads arranged upon said support and movable thereon toward and from each other, a hydraulic motor connected to one of said heads, a pump for supplying liquid to said motor to cause it to move said head at a definite rate proportional to pump delivery, mechanism connecting said heads to each other and normally operable to move the other head in synchronism with said motor driven head but in the opposite direction and at a definite rate proportional to the rate of movement of said motor driven head, means responsive to said heads reaching predetermined points in their advance toward each other for positively limiting further advance of said other head and for effecting reverse movement thereof during continued advance of said motor driven head, a piston and a cylinder providing a connection between said mechanism and said other head, a relief valve connected to said cylinder for permitting said reverse movement, and a second pump for supplying liquid to said cylinder to maintain pressure therein.

WALTER FERRIS.
ERNST WIEDMAN.
DONALD CLUTE.